(12) United States Patent
Wang et al.

(10) Patent No.: US 9,107,123 B2
(45) Date of Patent: Aug. 11, 2015

(54) SYSTEMS AND METHODS FOR LIMITING MOBILE DEVICE MEASUREMENTS FOR CELL RESELECTION AND HANDOVER

(71) Applicant: FutureWei Technologies, Inc., Plano, TX (US)

(72) Inventors: Julia Wang, San Diego, CA (US); Shuqing Xing, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 17 days.

(21) Appl. No.: 13/960,507

(22) Filed: Aug. 6, 2013

(65) Prior Publication Data

US 2015/0045020 A1 Feb. 12, 2015

(51) Int. Cl.
*H04W 36/00* (2009.01)
*H04W 52/02* (2009.01)

(52) U.S. Cl.
CPC ...... *H04W 36/0088* (2013.01); *H04W 36/0016* (2013.01); *H04W 52/0245* (2013.01); *H04W 52/0254* (2013.01)

(58) Field of Classification Search
USPC .............. 455/433, 517, 552.1, 574, 573
See application file for complete search history.

(56) References Cited

U.S. PATENT DOCUMENTS

| | | | |
|---|---|---|---|
| 7,480,519 B2 | 1/2009 | Jeong et al. | |
| 2009/0011783 A1* | 1/2009 | Kitazoe | 455/517 |

* cited by examiner

*Primary Examiner* — Sam Bhattacharya
(74) *Attorney, Agent, or Firm* — Slater & Matsil, L.L.P.

(57) ABSTRACT

System and method embodiments are provided for limiting mobile device neighbor cell measurements for cell reselection and handover. In an embodiment, a method in a mobile device for limiting neighbor cell search and measurements for reselection and handover includes determining a state of the mobile device from one of a plurality of states, wherein the states comprises an idle state, a static-idle state, a connected state, and a static-connected state defining idle state to static-idle state and connected state to static-connected state transition criteria; defining static-idle state to idle state and static-connected state to connected state transition criteria; and selecting a time interval to wait between successive neighbor cell search and measurements for cell reselection and handover according to the state of the wireless device, wherein the time interval corresponding to one of the states is less than the time interval corresponding to another of the states.

40 Claims, 6 Drawing Sheets

(12) United States Patent

SYSTEMS AND METHODS FOR LIMITING MOBILE DEVICE MEASUREMENTS FOR CELL RESELECTION AND HANDOVER

TECHNICAL FIELD

The present invention relates to a system and method for wireless communications, and, in particular embodiments, to a system and method for limiting mobile device cell measurements during cell reselection or handover.

BACKGROUND

Mobile device standby and talk time are crucial decision factors for mobile device consumers. Consequently, mobile device battery life is of growing importance for manufacturers, service providers, and mobile device users. Battery time performance is a conformance requirement of service providers and has a major effect on technical acceptance decisions. In order to maintain battery life, power consumption is a major challenge for mobile device manufacturers. One significant battery consuming operation of mobile devices is cell search and measurement. The battery consumption due to cell search and measurement for cell reselection and/or handover is a serious issue for mobile devices located at the edge of a cell or in an area of pilot pollution where cell search and measurement as well as cell reselection/handover are triggered much more frequently.

SUMMARY OF THE INVENTION

In accordance with an embodiment a method in a mobile device for limiting search and measurements for cell reselection and handover includes determining a state of the mobile device, wherein the state comprises one of an idle state and a static-idle state for reselection, and wherein the state comprises one of a connected state and a static-connected state for handover; selecting a time interval to wait between successive neighbor cell search and measurements for cell reselection according to the state of the mobile device, wherein the time interval corresponding to one of the states is less than the time interval corresponding to another of the states.

In accordance with another embodiment, a mobile device configured for limiting search and measurements for cell reselection and handover includes a processor and a computer readable storage medium storing programming for execution by the processor, the programming including instructions to: determine a state of the mobile device from one of a plurality of states, wherein the states comprises an idle state, a static-idle state, a connected state, and a static-connected state; and selecting a time interval to wait between successive neighbor cell search and measurements for cell reselection and handover according to the state of the wireless device, wherein the time interval corresponding to one of the states is less than the time interval corresponding to another of the states.

In accordance with another embodiment, a mobile device includes a processor and a memory connected to the processor and configured to store a measurement condition and a mobility-activity state of the mobile device, wherein the processor is configured to perform neighbor cell search and measurement for cell reselection and handover at a time interval specified by the mobility-activity state of the mobile device and the measurement condition, and wherein the processor is configured to transition from a first mobility-activity state to a second activity state based on a mobility of the mobile device and a connected status of the mobile device.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In many systems, the same neighbor cell search and measurement rules and intervals are applied for mobile devices in an idle state without considering whether the devices are stationary or moving. Additionally, the same neighbor cell measurement rules and intervals for the mobile devices in the connected state are applied without consideration of whether the device is stationary or moving. In such systems, the mobile devices may perform unnecessary cell search and/or measurements when the devices are stationary, thereby causing the mobile device to use precious battery resources. However, when the devices are stationary, previous cell measurements may still be valid and, therefore, there may not be any need to measure the cells as frequently for stationary devices as for mobile devices that are moving.

Some systems combine information from neighbor lists received from first and second radio access technologies (RATs) and decide whether to take measurements in a third RAT based on the combined information. However, such systems only reduce the number of times of cell measurements for inter-RAT cell reselection.

Disclosed herein are systems and methods for mobile devices to determine when and how to perform neighbor cell measurements for cell reselection and handover. In an embodiment, a mobile device adjusts the cell measurement rules and the cell measurement intervals for performing a cell measurement for cell reselection and handover according to whether the mobile device is stationary or moving. If the mobile device is stationary, the mobile device performs neighbor cell measurements less frequently than if the mobile device is moving. Accordingly, unnecessary cell search/measurements performed by mobile devices are reduced while the devices are stationary. When the devices are stationary, previous neighbor cell measurements for neighbor cells may still be valid, thereby eliminating the need to make neighbor cell measurements as frequently as necessary for devices that are moving.

In an embodiment, mobile device states and cell search/measurement rules for a mobile device are provided to reduce neighbor cell search and measurements. The mobile device states include static-idle state and static-connected state. In an embodiment, when the mobile devices are in a static state, the neighbor cell search/measurement interval is increased and the mobile device performs fewer search/measurements. The disclosed states and rules can further limit neighbor cell search and measurement for the mobile devices in static states, thereby reducing power consumption and preserving battery life.

In an embodiment, a mobile state transition evaluation process is provided. The disclosed systems and methods apply to any type of radio access technology (RAT) including Long Term Evolution (LTE), Wideband Code Division Multiple Access (WCDMA), Global System for Mobile Communications (GSM), Enhanced Voice-Data Optimized (EVDO) networks, and Wireless Network Extender (1×). Embodiments of the disclosed systems and methods apply to intra-frequency cell reselection/handover, inter-frequency cell reselection/handover, and inter-RAT cell reselection handover.

In an embodiment, the systems and methods for reduced search/measurements for mobile devices improves the battery life of the mobile devices. In embodiment, the disclosed systems and methods reduce signaling messages and improve network performance. Additionally, the increase in battery life increases both the standby and talk times of the mobile device between recharging, thereby resulting in a better user experience. Also, there is little to no impact on the user experience since the disclosed systems and methods do not involve a downgrade in service nor do they require services or features to be disabled or turned off in order to conserve the battery life for the mobile devices. Furthermore, in an embodiment, no additional circuitry and no hardware changes are needed in mobile devices in order to implement the disclosed systems and methods.

In an embodiment, a mobile device is in one of four states. The mobile device states are static-idle, static-connected, idle, and connected. The mobile device determines an appropriate time interval for performing successive neighbor cell search and measurement activities based on or according to the particular state that the mobile device is in. In an embodiment, the time interval is greatest for the mobile device in the static-idle state since the device is not moving (or is moving less than a threshold amount during a specified time frame or a time window) and is not actively connected to a phone call (i.e., an active phone call) or transmitting/receiving data (e.g., downloading a web page, downloading streaming video or audio, uploading video or audio, sending or receiving a text message). Therefore, since the mobile device is not moving, it may be assumed that the signal strengths and signal quality of neighboring cell transmission points are not changing (or changes are very small and in a predefined range).

In an embodiment, a wireless device transitions from an idle state to a static-idle state or from a connected state to a static-connected state when a change in a reference signal received power and a reference signal received quality of a first J identified neighbor cells with a highest reference signal received power and a highest reference signal received quality is within a defined range in a latest K consecutive measurement cycles, wherein J is an integer and K is an integer. In another embodiment, a wireless device transitions from the static-idle state to the idle state or from the static-connected state to the connected state when a change of a reference signal receiver power and a reference signal received quality of a first M identified neighbor cells with a highest reference signal received power and a highest reference signal received quality exceed a specified range in a latest N consecutive measurement cycles, wherein M is an integer and N is an integer.

In an embodiment, for intra-frequency reselection measurement, a wireless device increases the neighbor cell measurement time interval for the mobile device is in the Static-idle state when at least one of a plurality of conditions is met, wherein the conditions consist of Sintrasearch is not included, and Sintrasearch is included and SservingCell is lower than Sintrasearch. For inter-frequency reselection measurement, a wireless device increases the neighbor cell measurement time interval for the mobile device is in the Static-idle state when at least one of a plurality of conditions is met, wherein the conditions consist of the serving frequency cellReselectionPriority is lower than other frequency cellReselectionPriority, the serving frequency cellReselectionPriority is higher than other frequency cellReselectionPriority and Snonintrasearch is not included, or the serving frequency cellReselectionPriority is higher than other frequency cellReselectionPriority and Snonintrasearch is included and Sservinfcell is lower than Snonintrasearch.

In an embodiment, a wireless device increases the time interval for the mobile device is in the static state and the connected state when at least one of a plurality of conditions is met, wherein the conditions consist of an s-Measure is not configured, an s-Measure is disabled, and an s-Measure is configured and a serving cell reference signal received power is lower than the s-Measure and a serving cell reference signal received power is greater than a neighbor cell's reference signal received power in L consecutive measurement cycles, wherein L is an integer, and where s-Measure is a serving cell quality threshold used to determine whether the mobile device is required to perform a measurement.

In an embodiment, a wireless device utilizes neighbor cells' reference signal received powers, reference signal received qualities, cell identifiers, and cell frequencies to perform a mobile device state transition evaluation.

Adjusting the frequency with which a wireless device performs neighbor cell search and measurements (e.g., polling neighboring cells) depending on the movement and connectivity of the wireless device allows the wireless device to conserve battery resources, thereby increasing the operation time before the wireless device must be recharged. Additionally, the disclosed systems and methods reduce the number of signaling messages (e.g., search and measurement polling), thereby improving network performance.

Figure 1:
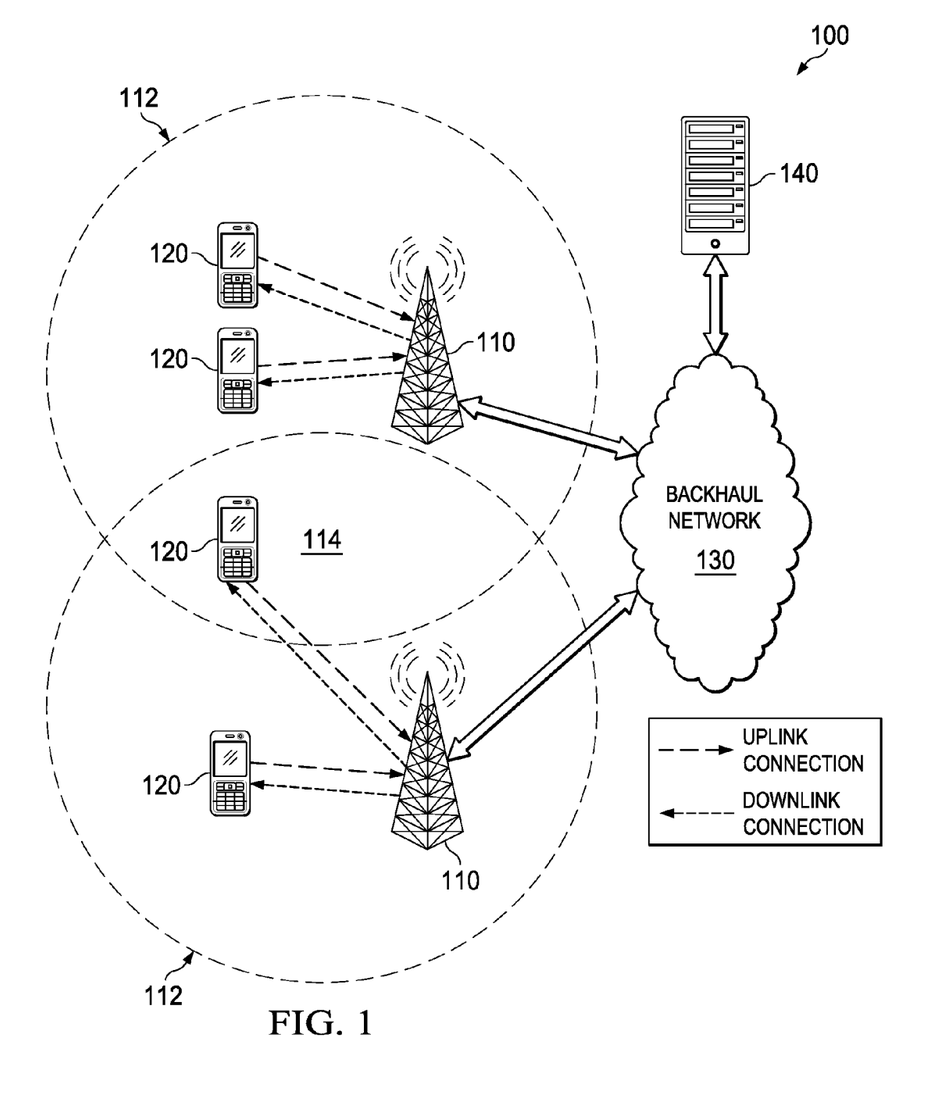
FIG. 1 illustrates a network for communicating data.

FIG. 1 illustrates a network 100 for communicating data. The network 100 comprises a plurality of access points (APs) 110 each having a coverage area 112, a plurality of user equipment (UEs) 120, a backhaul network 130, and a central server 140. The coverage areas 112 of the two APs 110 include an overlapping coverage area 114. In an embodiment, the coverage areas 112 are equivalent to cells. As used herein, the term AP may also be referred to as a transmission point (TP) or a BTS and the three terms may be used interchangeably throughout this disclosure. As used herein, the term UE may also be referred to as a wireless device and the two terms may be used interchangeably throughout this disclosure. The AP 110 may comprise any component capable of providing wireless access by, inter alia, establishing uplink (dashed line) and/or downlink (dotted line) connections with the UEs 120, such as a BTS, an Evolved Node B (eNB), a femtocell, and other wirelessly enabled devices. The UEs 120 may comprise any component capable of establishing a wireless connection with the AP 110. Examples of UEs include smart phones, laptop computers, and tablet computers. The backhaul network 130 may be any component or collection of components that allow data to be exchanged between the AP 110 and a remote end (not shown) and with the central server 140. In some embodiments, the network 100 may comprise various other wireless devices, such as relays, femtocells, etc.

Depending on mobility and connectivity, the UEs 120 adjust the interval between successive search and measurement operations for determining signal strength and quality for neighboring cells in order to determine whether cell reselection and handover is appropriate. If the UE 120 is in a static-idle state (i.e., substantially stationary state, e.g., not actively communicating with another device, e.g., not connected to another device for a phone call, not downloading content to a web page, etc.), then the UE 120 adjusts its time interval between successive search and measurement operations to be greater than it would be if the UE 120 is in an idle state (e.g., the idle state defined in standards). If the UE 120 is in a static-connected state (e.g., substantially stationary and connected state), the UE 120 adjusts its time interval between successive search and measurement operations to be greater than it would be if the UE 120 were in connected state. The UE 120 may be in a static state if the motion or movement of the UE 120 is less than a threshold amount during a specified time frame. For example, in an embodiment, if the change of the reference signal received power and reference signal received quality of the first J identified neighbor cells with the highest reference signal received power and quality is within a defined range in the latest K consecutive measurement cycles.

In an embodiment, there are four mobile device states: static-idle, static-connected, idle, and connected. In the static-idle state, the UE 120 is not moving (or moving less than a threshold amount) and idle; in the static-connected state, the UE 120 is not moving and connected; in the idle state, the UE 120 is idle, but is moving; and in the connected state, the UE 120 is connected and moving.

In an embodiment, the time interval between successive neighbor cell search and measurements to determine whether to perform a cell reselection and handover is longest for the UE 120 in the static-idle state. The time interval when the UE 120 is in the static-connected state is shorter than the time interval when the UE 120 is in the static-idle state, but longer than if the UE 120 is in the idle or connected states. The time interval when the UE 120 is in the idle state is shorter than the time interval for the UE 120 when it is in either the static-idle or static-connected state. The time interval for the UE 120 when the UE 120 is in the connected state is shorter than in any of the static-idle state, the static-connected state.

When the UE 120 is in the static-idle state, it may be assumed that the previous measurement results of neighboring cells might be more or less the same with time. Therefore, since the UE 120 is not moving and since the UE 120 is idle, there is no need for the UE 120 to measure neighboring cells as frequently as when it in moving. When the UE 120 is in the static-connected state, it may be assumed that the signal strength and quality of neighboring cells is not changing significantly with time and therefore, it is not necessary to perform search and measurements as often. However, since the UE 120 is connected, it is more critical that the UE 120 be connected to the cell with the best signal strength and quality than when the UE 120 is in the static-idle state in order to provide the user with a good quality of use experience. When the UE 120 is in the idle state (but moving), it is necessary to perform neighbor cell search and measurements more frequently than when the UE 120 is in either static state, since the signal quality and strength of the serving cell and the neighboring cells may change dramatically with location. When the UE 120 is in the connected state (but moving), the UE 120 performs neighbor cell search and measurements more frequently than if the UE is in either static state or in an idle state since the signal quality and strength of the cells may change dramatically with location of the UE 120 and since the UE is connected, it is more important to maintain a good signal quality/strength with a serving cell to ensure a good user experience.

In an embodiment, when the wireless device is unable to determine the movement of the wireless device, the wireless device defaults to the idle state or the connected state, depending on whether the wireless device is in idle or connected. This state assumes that the wireless device may be moving and therefore performs search and measurements more frequently as specified by the idle and connected states.

In an embodiment, each cell (i.e., coverage area 112) and/or AP 110 includes a cell identifier. Each AP 110 may transmit in one or more cell frequencies and may receive signals from the UEs 120 in one or more cell frequencies. The UL and DL frequencies may be the same or different. Each AP 110 transmits a cell reference signal and the UEs 120 measure the cells reference signal received power. Each UE 120 may also measure other reference signal received qualities, such as channel quality. In an embodiment, the UE 120 selects the AP 110 having the highest reference signal received power.

In an embodiment, the UE 120 determines its position and movement through triangulation using signals from a number of APs 110. In other embodiments, the UE 120 uses a Global Positioning System (GPS) to determine its location and movement. Other embodiments may utilize other methods of determining the movement of the UE 120. In some embodiments, multiple methods of determining the UEs 120 location and movement are utilized.

Figure 2:
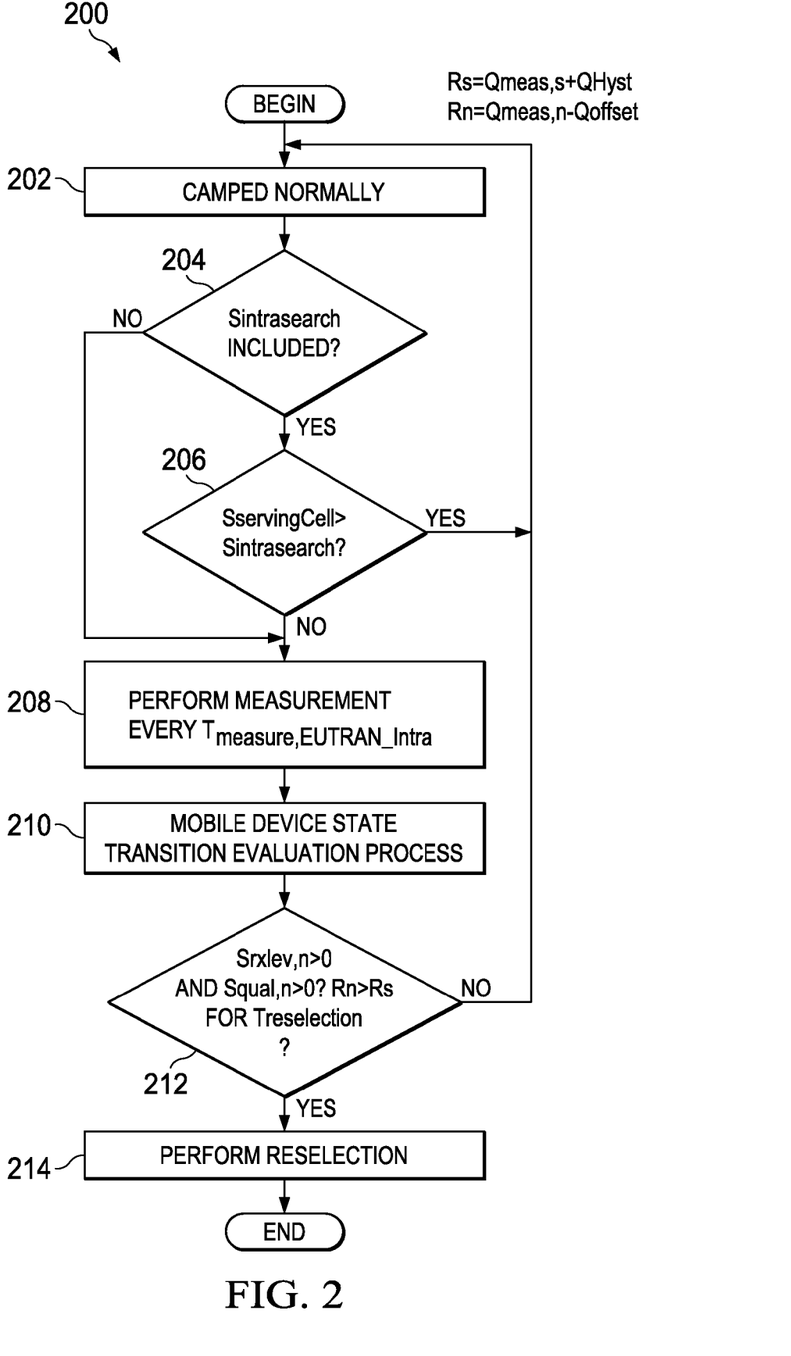
FIG. 2 is a flowchart of an embodiment method for performing LTE Intra-Frequency cell reselection.

FIG. 2 is a flowchart of an embodiment method 200 for performing LTE Intra-Frequency cell reselection. The method begins at block 202 where the wireless device is camped normally. The method 200 proceeds to block 204 where the wireless device determines whether Sintrasearch is included. Sintrasearch specifies thresholds (RSRP/RSRQ) for intra-frequency measurements. If Sintrasearch is included, then the method 200 proceeds to block 206 here the wireless device determines whether SservingCell is greater than Sintrasearch. SservingCell are the values (receiver level and quality) measured from the serving cell. If, at block 206, the wireless device determines that the SservingCell is greater than Sintrasearch, then the method 200 proceeds to block 202 where the wireless device is camped normally.

If, at block 204, the Sintrasearch is not included or, at block 206, the SservingCell is not greater than Sintrasearch, the method 200 proceeds to block 208 where the wireless device performs neighbor cell signal measurement periodically at a time interval, $T_{measure,EUTRAN\_Intra}$. $T_{measure,EUTRAN\_Intra}$ is the intra-frequency neighbor measurement interval. The wireless device executes a mobile device state transition evaluation process at block 210 to determine the appropriate time interval, $T_{measure,EUTRAN\_Intra}$. From block 210, the method 200 proceeds to block 212 where the wireless device determines whether Srxlev,n>0 and Squal, n>0 and whether Rn is greater than Rs for Treselection. Srxlev and Squal are cell reselection criteria for the receiver level and quality. Rs is the serving cell rank and Rn is the neighbor cell rank. Rs=Qmeas,s+QHyst (equation for calculating serving cell rang Rs); and Rn=Qmeas,n−Qoffset (equation for calculating neighbor cell rank Rn). If either of these conditions are not met, then the method 200 proceeds to block 202. If both conditions in block 212 are met, then the method 200 proceeds to block 214 where the wireless device performs reselection, after which, the method 200 ends.

Figure 3:
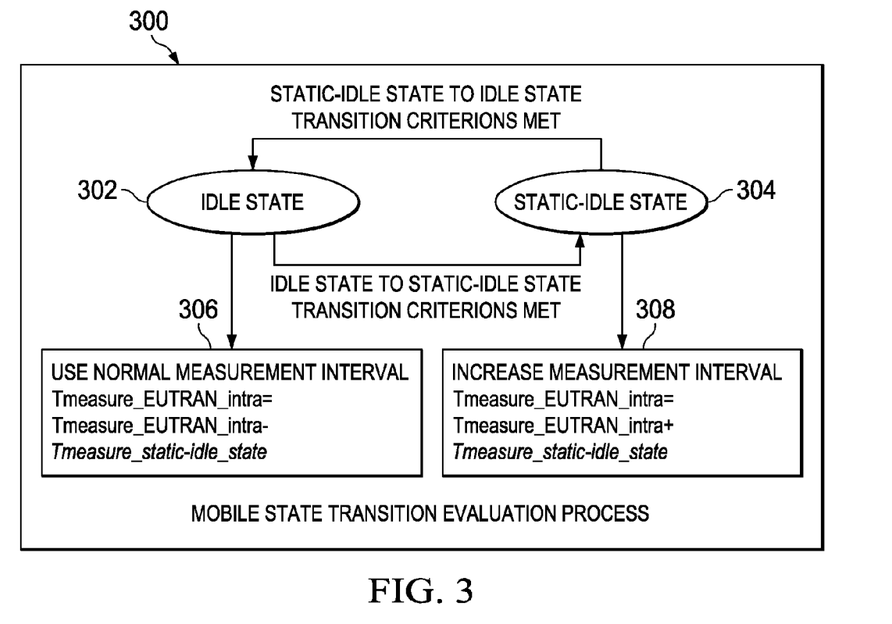
FIG. 3 is a state diagram illustrating an embodiment system for LTE Intra-Frequency cell reselection.

FIG. 3 is a state diagram illustrating an embodiment system 300 for LTE Intra-Frequency cell reselection. When the wireless device is in the idle state 302, the wireless device uses normal measurement intervals shown in block 306 (e.g., the same rules as defined in standards). When idle state to static-idle state transition criteria are met, the wireless device transitions from the idle state 302 to the static-idle state 304. In the static-idle state, the wireless device uses an increased measurement interval over the interval used in the idle state 302. The increased measurement interval is shown in block 308. When the static-idle state to the idle state transition criteria are met, the wireless device transitions from the static-idle state 304 to the idle state 302.

Figure 4:
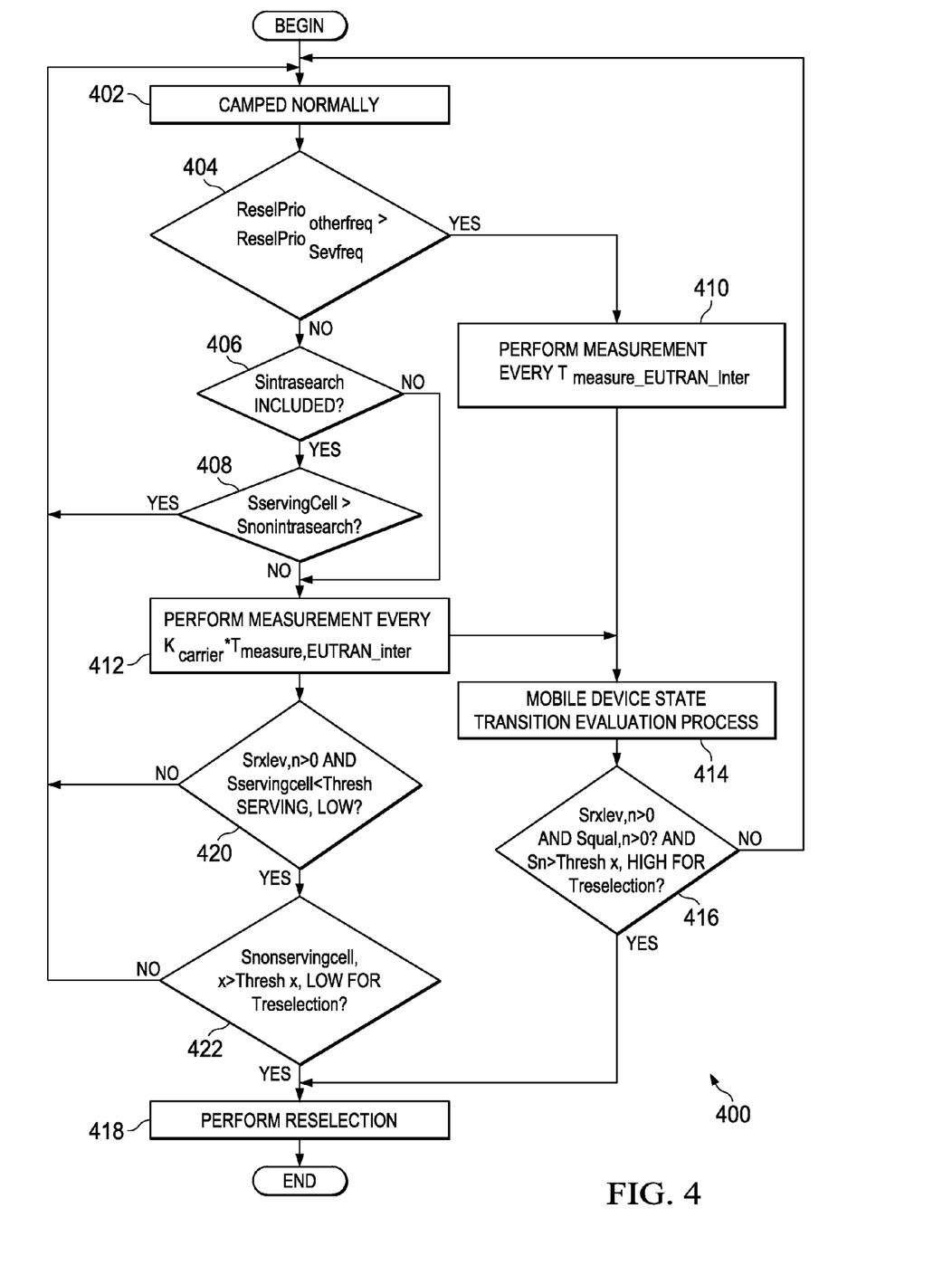
FIG. 4 is a flowchart of an embodiment method for LTE Inter-Frequency cell reselection

FIG. 4 is a flowchart of an embodiment method 400 for LTE Inter-Frequency cell reselection. The method 400 begins at block 402 where the wireless device is camped normally. The method 400 proceeds to block 404 where the wireless device determines whether the ReselPrio$_{otherfreq}$ is greater than the ReselPrio$_{Sevfreq}$. ReselPrio$_{otherfreq}$ is reselection priority of other frequency. ReselPrio$_{Sevfreq}$ is the reselection priority of serving frequency. If the condition in block 404 is met, then the method 400 proceeds to block 410 where the wireless device performs search and measurement at time interval, T$_{measure,EUTRAN\_inter}$ where T$_{measure,EUTRAN\_inter}$ is determined by the mobile device state transition evaluation process in block 414. If the condition in block 404 is not met, then the method 400 proceeds to block 406 where the wireless device determines whether Sintrasearch is included. T$_{measure,EUTRAN\_inter}$ is the inter-frequency neighbor cell measurement interval. If Sintrasearch is not included, then the method 400 proceeds from block 406 to block 412 where the wireless device performs a measurement for every Kcarrier*T$_{measure,EUTRAN\_inter}$ where T$_{measure,EUTRAN\_inter}$ is determined by the mobile device state transition evaluation process in block 414. If at block 406, the wireless device determines that the Sintrasearch is included, then the method 400 proceeds to block 408 where the wireless device determines whether SservingCell is greater than Snoninstrasearch and, if yes, the method 400 proceeds to block 402 and, if no, the method 400 proceeds to block 412.

At block 410, after performing measurements every T$_{measure,EUTRAN\_inter}$, the method 400 proceeds to block 414 to execute the mobile device state transition evaluation. From block 414, the method 400 proceeds to block 416 where the wireless device determines whether two conditions are met. The first condition is whether Srxlev,n>0 and Squal,n>0. The second condition is whether Sn>Thresh x,high for Treselection (i.e., whether the neighbor cell receiver level and quality are greater than a signaled threshold for Treselection time). If either of the two conditions in block 416 are not met, then the method 400 proceeds to block 402. If both conditions in block 416 are met, then the method 400 proceeds to block 418 where the wireless device performs reselection, after which the method 400 ends.

At block 412, after performing the measurement every Kcarrier*T$_{measure,EUTRAN\_inter}$, the method 400 proceeds to block 414 to execute the mobile device state transition evaluation. From block 414, the method 400 proceeds to block 420 where the wireless device determines whether Srxlev,n>0 and whether Sservingcell is less than Threshserving,low. Kcarrier*T$_{measure,EUTRAN\_inter}$ are typically defined by standards and the wireless device receives the values from the serving cell over the air. If one of the conditions in block 420 is not met, then the method 400 proceeds to block 402. If both conditions in block 420 are met, then the method 400 proceeds to block 422. At block 422, the wireless device determines whether Snonservingcell,x is greater than the Thresh x,low for Treselection. If the condition in block 422 is not met, then the method 400 proceeds to block 402. If the condition in block 422 is met, then the method 400 proceeds to block 418 where the wireless device performs reselection, after which the method 400 ends.

Figure 5:
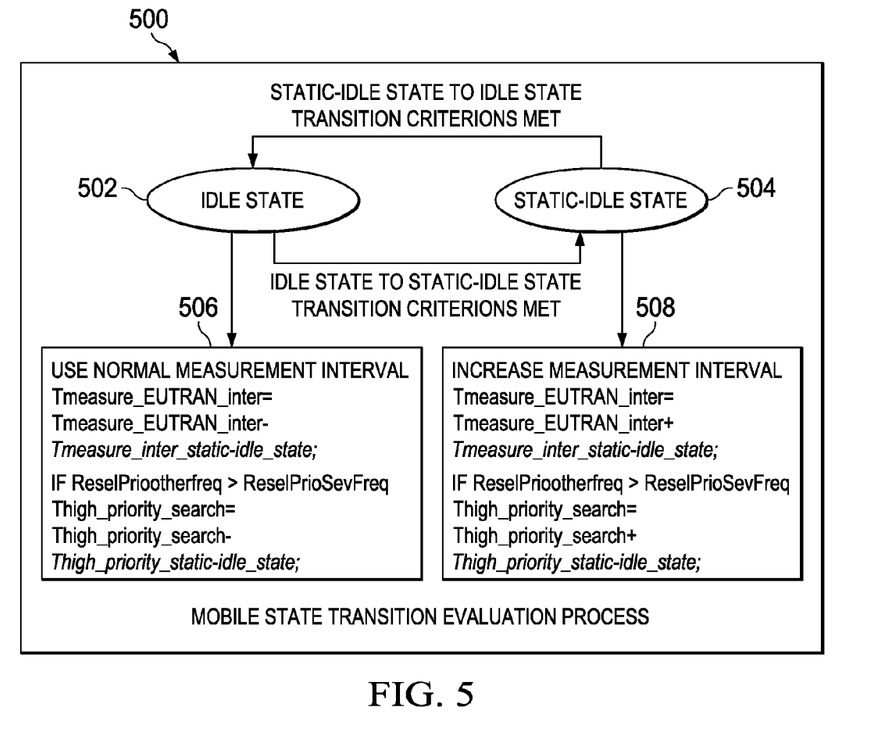
FIG. 5 is a state diagram illustrating an embodiment system for LTE Inter-Frequency cell reselection.

FIG. 5 is a state diagram illustrating an embodiment system 500 for LTE Inter-Frequency cell reselection. When the wireless device is in the idle state 502, the wireless device uses the normal measurement interval and reselection criteria specified in block 506 (i.e., use the same rules as defined in the standards). When the wireless device is in the static-idle state 504, the wireless device uses the increased measurement interval and reselection criteria specified in block 508. The wireless device transitions from idle state 502 to static-idle state 504 when the idle stat to static-idle state transition criteria are met. The wireless device transitions from the static-idle state 504 to the idle state 502 when the static-idle stat to idle state transition criteria are met.

In the case where ReselPriootherfreq>ReselPrioSevFreq, then the following state transition procedures are followed. If the mobile device is in the idle state 502 and if the state transition criteria are met, then change the mobile state from idle state 502 to static-idle state 504, set the measurement interval T$_{measure\_EUTRAN\_inter}$=T$_{measure\_EUTRAN-inter}$T$_{measure\_inter\_static-idle\_state}$ and set the search interval T$_{high\_priority\_search}$=T$_{high\_priority\_search}$+T$_{high\_priority\_static-idle\_state}$. If the mobile device is in the static-idle state 504 and if the state transition criteria are met, change the mobile state from static-idle state to idle state, set the measurement interval T$_{measure\_EUTRAN\_inter}$=T$_{measure\_EUTRAN\_inter}$-T$_{measure\_inter\_static-idle\_state}$, and set the search interval T$_{high\_priority}$=T$_{high\_priority\_search}$-T$_{high\_priority\_static-idle\_state}$.

Otherwise, if ReselPriootherfreq is not >ReselPrioSevFreq, then the following state transition procedures are followed. If the mobile device is in the idle state and if the state transition criteria are met, change the mobile state from idle state to Static-idle state and set the measurement interval to T$_{measure\_EUTRAN\_inter}$=T$_{measure\_EUTRAN\_inter}$+T$_{measure\_inter\_static-idle\_state}$. If the mobile device is in static-idle state and if the state transition criteria are met, change the mobile state from static-idle state to idle state and set the measurement interval to T$_{measure\_EUTRAN\_inter}$=T$_{measure\_EUTRAN\_inter}$-T$_{measure\_inter\_static-idle\_state}$.

Figure 6:
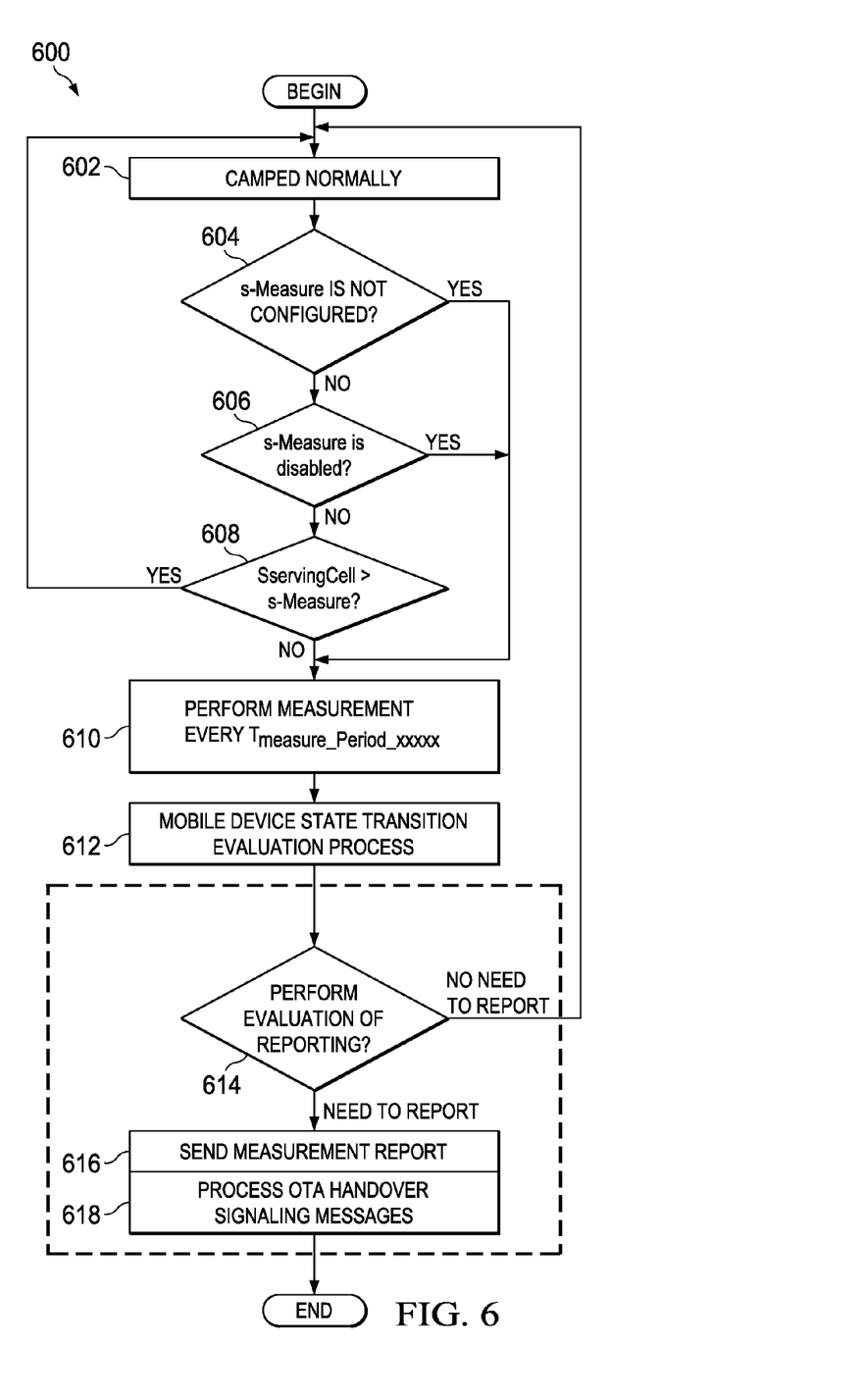
FIG. 6 is a flowchart of an exemplary method for LTE Intra-Frequency, Inter-Frequency, and Inter-RAT handover

FIG. 6 is a flowchart of an exemplary method 600 for LTE Intra-Frequency, Inter-Frequency, and Inter-RAT handover. The method 600 begins at block 602 where the wireless device is camped normally. From block 602, the method 600 proceeds to block 604 where the wireless device determines whether s-Measure is not configured. If, at block 604, it is determined that the s-Measure is not configured, then the method 600 proceeds to block 610. If, at block 604, it is determined that s-Measure is configured, then the method proceeds to block 606. At block 606, the wireless device determines whether s-Measure is disabled and, if so, the method 600 proceeds to block 610, and, if not, then the method 600 proceeds to block 608. At block 608, the wireless device determines whether SservingCell is greater than s-Measure and, if not, the method proceeds to block 610, and, if yes, then the method 600 proceeds to block 602.

At block 610, the wireless device performs a measurement every T$_{measure\_Period\_xxxx}$ where T$_{measure\_Period\_xxxxx}$ is determined based on the mobile device state and the mobile device state transition evaluation process in block 612. From block 610, the method 600 proceeds to block 614 where the wireless device determines whether reporting is needed and, if not, the method proceeds to block 602, and, if reporting is needed, the method 600 proceeds to block 616. If the measurement report criteria are met, the wireless device sends the measurement reports to its serving cell. At block 616, the wireless device sends a measurement report after which the method 600 proceeds to block 618. At block 618, the wireless device processes OTA handover signaling messages, after which, the method 600 ends.

Figure 7:
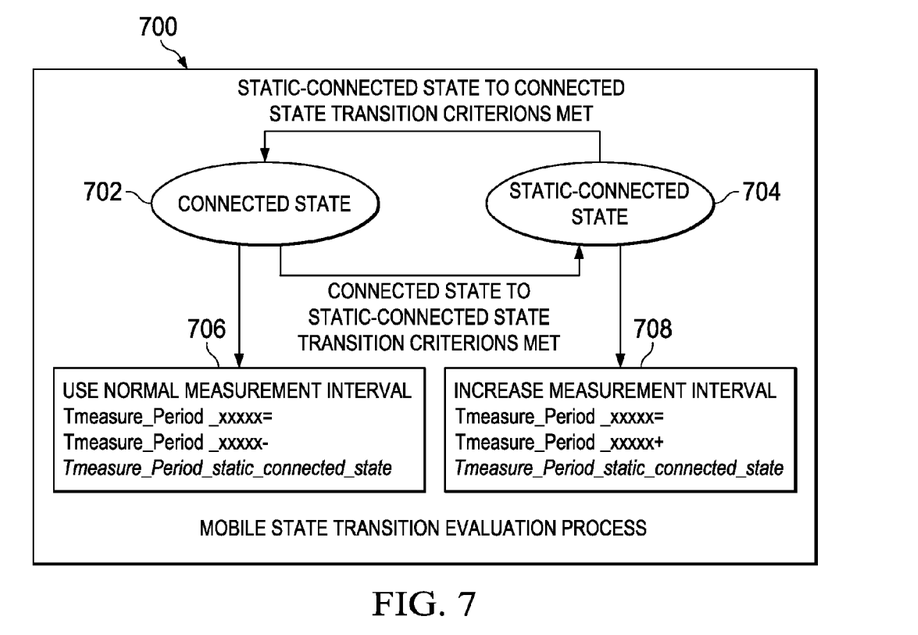
FIG. 7 is a state diagram illustrating an embodiment system for LTE Intra-Frequency, Inter-Frequency, and Inter-RAT handover.

FIG. 7 is a state diagram illustrating an embodiment system 700 for LTE Intra-Frequency, Inter-Frequency, and Inter-RAT handover. When the wireless device is in the connected state 702, the wireless device uses the normal measurement intervals as shown in block 706. When the wireless device is in the static-connected state 704, the wireless device uses the increased measurement interval as shown in block 708. The wireless device transitions from the connected state 702 to the static-connected state 704 when the static-connected state transition criteria are met. The wireless device transitions from the static-connected state 704 to the connected state 702 when the static-connected state to connected state transition criteria are met.

When transitioning from the connected state to the static-connected state or if the wireless device is in the static-connected state, set the measurement period $T_{measure\_Period\_xxxxx} = T_{measure\_Period\_xxxxx} + T_{measure\_Period\_static\_connected\_state}$ if the wireless device meets one of the following criteria: if s-Measure is not configured, if s-Measure is disabled, or if s-Measure is configured and the serving cell reference signal received power is lower than the s-Measure and the serving cell reference signal received power is greater than the neighbor cell's reference signal received power in the latest L consecutive measurement cycles, where L is some integer. This method may be useful where the wireless device is in the static-connected state and/or when the wireless device is in the cell edge or an area of pilot pollution. Some advantages of this method may include reducing neighbor cell measurements, reducing signaling messages, saving battery life, and improving network performance.

Although the disclosed systems and methods have been described primarily with reference to LTE, those of ordinary skill in the art will recognize that the systems and methods disclosed herein are not so limited, but may be applied to any wireless technology.

Figure 8:
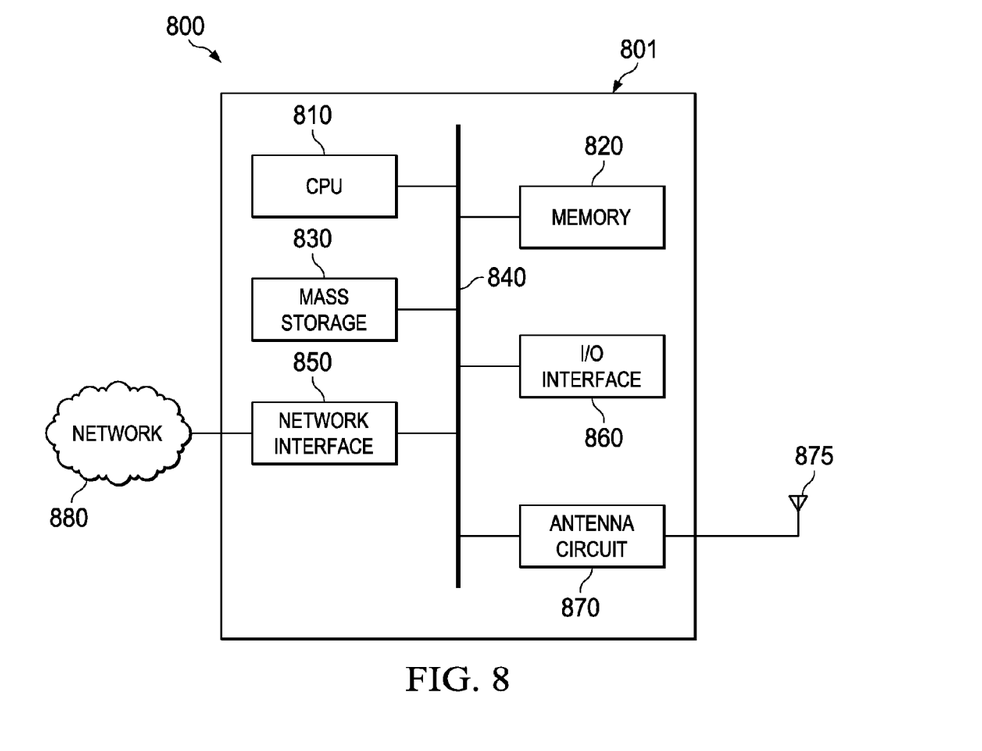
FIG. 8 is a processing system that can be used to implement various embodiments.

FIG. 8 is a block diagram of a processing system 800 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 800 may comprise a processing unit 801 equipped with one or more input/output devices, such as a speaker, microphone, mouse, touchscreen, keypad, keyboard, printer, display, and the like. The processing unit 801 may include a central processing unit (CPU) 810, memory 820, a mass storage device 830, a network interface 850, an I/O interface 860, and an antenna circuit 870 connected to a bus 840. The processing unit 801 also includes an antenna element 875 connected to the antenna circuit.

In an embodiment, the CPU 810 is configured to determine the location of the processing system 800. For example, the CPU 810 may determine the location of the processing system 800 via multilateration of radio signals between (several) radio towers of the network and the phone or via GPS. In an embodiment, the CPU 810 may determine the location of the processing system 800 via signals received from a network, where the network uses network based techniques, such as triangulation, to determine the location of the processing system 800. In an embodiment, the CPU 810 is also configured to determine absolute and/or relative changes in the location of the processing system 800.

The bus 840 may be one or more of any type of several bus architectures including a memory bus or memory controller, a peripheral bus, video bus, or the like. The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs.

The mass storage device 830 may comprise any type of storage device configured to store data, programs, and other information and to make the data, programs, and other information accessible via the bus 840. The mass storage device 830 may comprise, for example, one or more of a solid state drive, hard disk drive, a magnetic disk drive, an optical disk drive, or the like.

The I/O interface 860 may provide interfaces to couple external input and output devices to the processing unit 801. The I/O interface 860 may include a video adapter. Examples of input and output devices may include a display coupled to the video adapter and a mouse/keyboard/printer coupled to the I/O interface. Other devices may be coupled to the processing unit 801 and additional or fewer interface cards may be utilized. For example, a serial interface such as Universal Serial Bus (USB) (not shown) may be used to provide an interface for a printer.

The antenna circuit 870 and antenna element 875 may allow the processing unit 801 to communicate with remote units via a network. In an embodiment, the antenna circuit 870 and antenna element 875 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 870 and antenna element 875 may also provide Bluetooth and/or WiFi connection to other devices.

The processing unit 801 may also include one or more network interfaces 850, which may comprise wired links, such as an Ethernet cable or the like, and/or wireless links to access nodes or different networks. The network interface 801 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method in a mobile device for limiting search and measurements for cell reselection and handover, the method comprising:
   determining a state of the mobile device from one of a plurality of states, wherein the states comprises an idle state, a static-idle state, a connected state, and a static-connected state; and
   selecting a time interval to wait between successive neighbor cell search and measurements for cell reselection and handover according to the state of the mobile device, wherein the time interval corresponding to one of the states is less than the time interval corresponding to another of the states.

2. The method of claim 1, wherein the time interval for the mobile device in the static-idle state is greater than the time interval for the mobile device in the idle state.

3. The method of claim 1, wherein the mobile device is in the static state if the mobile device moves less than a threshold amount during a time window.

4. The method of claim 1, wherein the time interval for the mobile device in the static-connected state is greater than the time interval for the mobile device in the connected state.

5. The method of claim 1, further comprising transitioning from the idle state to the static-idle state or from the connected state to the static-connected state when a change in a reference signal received power and a reference signal received quality of a first J identified neighbor cells with a highest reference signal received power and a highest reference signal received quality is within a defined range in a latest K consecutive measurement cycles, wherein J is an integer and K is an integer.

6. The method of claim 1, further comprising transitioning from the static-idle state to the idle state or from the static-connected state to the connected state when a change of a reference signal receiver power and a reference signal received quality of a first M identified neighbor cells with a highest reference signal received power and a highest reference signal received quality exceed a specified range in a latest N consecutive measurement cycles, wherein M is an integer and N is an integer.

7. The method of claim 1, further comprising utilizing neighbor cells' reference signal received powers, reference signal received qualities, cell identifiers, and cell frequencies to perform a mobile device state transition evaluation.

8. The method of claim 1, further comprising increasing the time interval for the mobile device for a long term evolution (LTE) intra-frequency neighbor cell measurement when the mobile device is in the Static-idle state when at least one of a plurality of conditions are met, wherein the conditions comprise a first condition wherein Sintrasearch is not included and a second condition wherein Sintrasearch is included and SservingCell is lower than Sintrasearch.

9. The method of claim 1, further comprising increasing the time interval for the mobile device for a long term evolution (LTE) inter-frequency neighbor cell measurement when the mobile device is in the static-idle state when at least one of a plurality of conditions is met, wherein the conditions comprise a first condition wherein a serving frequency cellReselectionPriority is lower than an other frequency cellReselectionPriority, a second condition wherein the serving frequency cellReselectionPriority is higher than an other frequency cellReselectionPriority and Snonintrasearch is not included, and a third condition wherein the serving frequency cellReselectionPrioity is higher than an other frequency cellREselectionPrioirty where Snonintrasearch is included and Sservinfcell is lower than Snonintrasearch.

10. The method of claim 1, further comprising increasing the time interval for the mobile device for at least one of a long term evolution (LTE) intra-frequency neighbor cell measurement, a LTE inter-frequency neighbor cell measurement, and an inter-radio access technology (inter-RAT) measurement when the mobile device is in the static-connected state when at least one of a plurality of conditions is met, wherein the conditions consist of an s-Measure is not configured, an s-Measure is disabled, and an s-Measure is configured and a serving cell reference signal received power is lower than the s-Measure and a serving cell reference signal received power is greater than a neighbor cell's reference signal received power in L consecutive measurement cycles, wherein L is an integer, and where s-Measure is a serving cell quality threshold used to determine whether the mobile device is required to perform a measurement.

11. The method of claim 1, further comprising selecting the time interval to wait between successive neighbor cell search and measurements for cell reselection and handover according to a measurement condition.

12. The method of claim 1, further comprising transitioning from the idle state to the static-idle state when transition criteria are met and setting the time interval from $T_{measure\_EUTRAN\_inter}$ to $T_{measure\_EUTRAN\_inter} + T_{measure\_inter\_static-idle\_state}$.

13. The method of claim 12, further comprising setting a search interval from $T_{high\_priority\_search}$ to $T_{high\_priority\_search} + T_{high\_priority\_static-idle\_state}$.

14. The method of claim 1, further comprising transitioning from the static-idle state to the idle state when state transition criteria are met and setting the time interval from $T_{measure\_EUTRAN\_inter}$ to $T_{measure\_EUTRAN\_inter} - T_{measure\_inter\_static-idle\_state}$.

15. The method of claim 14, further comprising setting a search interval from $T_{high\_priority\_search}$ to $T_{high\_priority\_search} - T_{high\_priority\_static-idle\_state}$.

16. The method of claim 1, further comprising transitioning from the connected state to the static-connected state when state transition criteria are met and setting the time interval from $T_{measure\_Period\_xxxxx}$ to $T_{measure\_Period\_xxxxx} + T_{measure\_Period\_static\_connected\_state}$.

17. The method of claim 1, further comprising transitioning from the static-connected state to the connected stat when state transition criteria are met and setting the time interval from $T_{measure\_Period\_xxxxx}$ to $T_{measure\_Period\_xxxxx} - T_{measure\_Period\_static\_connected\_state}$.

18. A mobile device configured for limiting search and measurements for cell reselection and handover comprising:
   a processor; and
   a computer readable storage medium storing programming for execution by the processor, the programming including instructions to:
      determine a state of the mobile device from one of a plurality of states, wherein the states comprises an idle state, a static-idle state, a connected state, and a static-connected state; and
      select a time interval to wait between successive neighbor cell search and measurements for cell reselection and handover according to the state of the mobile device, wherein the time interval corresponding to one of the states is less than the time interval corresponding to another of the states.

19. The mobile device of claim 18, wherein the time interval for the mobile device in the static-idle state is greater than the time interval for the mobile device in the idle state.

20. The mobile device of claim 18, wherein the mobile device is in the static state if the mobile device moves less than a threshold amount during a time window.

21. The mobile device of claim 18, wherein the time interval for the mobile device in the static-connected state is greater than the time interval for the mobile device in the connected state.

22. The mobile device of claim 18, wherein the programming further comprises instructions to transition from the idle state to the static-idle state or from the connected state to the static-connected state when a change in a reference signal received power and a reference signal received quality of a first J identified neighbor cells with a highest reference signal received power and a highest reference signal received quality is within a defined range in a latest K consecutive measurement cycles, wherein J is an integer and K is an integer.

23. The mobile device of claim 18, wherein the programming further comprises instructions to transition from the static-idle state to the idle state or from the static-connected state to the connected state when a change of a reference signal receiver power and a reference signal received quality of a first M identified neighbor cells with a highest reference signal received power and a highest reference signal received quality exceed a specified range in a latest N consecutive measurement cycles, wherein M is an integer and N is an integer.

24. The mobile device of claim 18, wherein the programming further comprises instructions to utilize neighbor cells' reference signal received powers, reference signal received qualities, cell identifiers, and cell frequencies to perform a mobile device state transition evaluation.

25. The mobile device of claim 18, wherein the programming further comprises instructions to increase the time interval for the mobile device for a long term evolution (LTE) intra-frequency reselection measurement when the mobile device is in the Static-idle state when at least one of a plurality of conditions are met, wherein the conditions comprise a first condition wherein Sintrasearch is not included and a second condition wherein Sintrasearch is included and SservingCell is lower than Sintrasearch.

26. The mobile device of claim 18, wherein the programming further comprises instructions to increase the time interval for the mobile device for a long term evolution (LTE) inter-frequency reselection measurement when the mobile device is in the static-idle state when at least one of a plurality of conditions is met, wherein the conditions comprise a first condition wherein a serving frequency cellReselectionPriority is lower than an other frequency cellReselectionPriority, a second condition wherein the serving frequency cellReselectionPriority is higher than an other frequency cellReselectionPriority and Snonintrasearch is not included, and a third condition wherein the serving frequency cellReselectionPriority is higher than an other frequency cellREselectionPrioirty where Snonintrasearch is included and Sservinfcell is lower than Snonintrasearch.

27. The mobile device of claim 18, wherein the programming further comprises instructions to increase the time interval for the mobile device for at least one of a long term evolution (LTE) intra-frequency measurement, a LTE inter-frequency measurement, and an inter-radio access technology (inter-RAT)measurement when the mobile device is in the static-connected state when at least one of a plurality of conditions is met, wherein the conditions consist of an s-Measure is not configured, an s-Measure is disabled, and an s-Measure is configured and a serving cell reference signal received power is lower than the s-Measure and a serving cell reference signal received power is greater than a neighbor cell's reference signal received power in L consecutive measurement cycles, wherein L is an integer, and where s-Measure is a serving cell quality threshold used to determine whether the mobile device is required to perform a measurement.

28. The mobile device of claim 18, wherein the programming further comprises instructions to select the time interval to wait between successive neighbor cell search and measurements for cell reselection and handover according to a measurement condition.

29. The mobile device of claim 18, further comprising transitioning from the idle state to the static-idle state when transition criteria are met and setting the time interval from $T_{measure\_EUTRAN\_inter}$ to $T_{measure\_EUTRAN\_inter}+T_{measure\_inter\_static\text{-}idle\_state}$.

30. The mobile device of claim 29, further comprising setting a search interval from $T_{high\_priority\_search}$ to $T_{high\_priority\_search}+T_{high\_priority\_static\text{-}idle\_state}$.

31. The mobile device of claim 18, further comprising transitioning from the static-idle state to the idle state when state transition criteria are met and setting the time interval from $T_{measure\_EUTRAN\_inter}$ to $T_{measure\_EUTRAN\_inter}-T_{measure\_inter\_static\text{-}idle\_state}$.

32. The mobile device of claim 31, further comprising setting a search interval from $T_{high\_priority\_search}$ to $T_{high\_priority\_search}-T_{high\_priority\_static\text{-}idle\_state}$.

33. The mobile device of claim 18, further comprising transitioning from the connected state to the static-connected state when state transition criteria are met and setting the time interval from $T_{measure\_Period\_xxxxx}$ to $T_{measure\_Period\_xxxxx}+T_{measure\_Period\_static\_connected\_state}$.

34. The mobile device of claim 18, further comprising transitioning from the static-connected state to the connected stat when state transition criteria are met and setting the time interval from $T_{measure\_Period\_xxxxx}$ to $T_{measure\_Period\_xxxxx}-T_{measure\_Period\_static\_connected\_state}$.

35. A mobile device comprising:
a processor; and
a memory connected to the processor and configured to store a measurement condition and a mobility-activity state of the mobile device,
wherein the processor is configured to perform neighbor cell search and measurement for cell reselection and handover at a time interval specified by the mobility-activity state of the mobile device and the measurement condition, and
wherein the processor is configured to transition from a first mobility-activity state to a second activity state based on a mobility of the mobile device and a connected status of the mobile device.

36. The mobile device of claim 35, wherein the mobility-activity states comprise a static-idle state, a static-connected state, an idle state, and a connected state.

37. The mobile device of claim 36, wherein the time interval corresponding to the static-idle state is greater than the time interval corresponding to the static-connected state, the time interval corresponding to the idle state, and the time interval corresponding to the connected state.

38. The mobile device of claim 36, wherein the time interval corresponding to the static-connected state is greater than the time interval corresponding to the connected state.

39. The mobile device of claim 36, wherein the time interval corresponding to the idle state is greater than the time interval corresponding to the connected state.

40. The mobile device of claim 39, wherein the processor is further configured to determine the mobility-activity state according to neighbor cells with a highest reference signal received power, neighbor cells with a highest reference signal received quality, neighbor cell identifiers, and neighbor cell frequencies.

* * * * *